United States Patent
Zhang et al.

(10) Patent No.: US 11,954,053 B2
(45) Date of Patent: Apr. 9, 2024

(54) INTEGRATING BUFFER VIEWS INTO BUFFER ACCESS OPERATIONS IN A COARSE-GRAINED RECONFIGURABLE COMPUTING ENVIRONMENT

(71) Applicant: SambaNova Systems, Inc., Palo Alto, CA (US)

(72) Inventors: Yaqi Zhang, Foster City, CA (US); Matthew Feldman, Oakland, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 17/965,688

(22) Filed: Oct. 13, 2022

(65) Prior Publication Data

US 2023/0350822 A1 Nov. 2, 2023

Related U.S. Application Data

(60) Provisional application No. 63/336,910, filed on Apr. 29, 2022.

(51) Int. Cl.
*G06F 13/16* (2006.01)

(52) U.S. Cl.
CPC .................. *G06F 13/1673* (2013.01)

(58) Field of Classification Search
CPC .. G06F 17/16; G06F 15/7892; G06F 15/8061; G06F 13/1673
See application file for complete search history.

(56) References Cited

U.S. PATENT DOCUMENTS

| | | | | |
|---|---|---|---|---|
| 11,467,827 | B1* | 10/2022 | Zuckerman | G06F 9/544 |
| 2010/0128998 | A1* | 5/2010 | Wegener | H04N 19/17 382/248 |
| 2017/0242590 | A1* | 8/2017 | Gokhale | G06F 12/0223 |
| 2023/0169316 | A1* | 6/2023 | Mills | G06F 7/78 706/15 |
| 2023/0300374 | A1* | 9/2023 | Kiyama | H04N 21/8456 375/240.12 |
| 2023/0333999 | A1* | 10/2023 | Omer | G06F 13/28 |

* cited by examiner

*Primary Examiner* — Phong H Dang
(74) *Attorney, Agent, or Firm* — Flagship Patents; Sikander M. Khan; Bruce Young

(57) ABSTRACT

A method for integrating buffer views into buffer access operations in a reconfigurable computing environment includes detecting, in an instruction stream for a reconfigurable dataflow unit (RDU), a buffer allocation statement comprising a tensor indexing expression, a buffer view indicator and one or more buffer view parameters. The method also includes lowering the buffer view parameters into the indexing expression according to the buffer view indicator to produce a modified tensor indexing expression, removing the buffer view indicator from the buffer allocation statement to produce a modified buffer allocation statement and allocating a buffer according to the modified buffer allocation statement. The modified buffer allocation statement may include the modified tensor indexing expression. A corresponding system and computer readable medium are also disclosed herein.

21 Claims, 18 Drawing Sheets

SliceView

Full Tensor

800 ⟶ buffer->view<SliceView>([1,1], [6,5])->
   add_read_pattern({ ⬉820 ⬉830
     For i in (0 until 4 by 1)
       For j in (0 until 5 by 1)
810 ⟶          Addr[0] = i ⟵840A
         Addr[1] = 4 - j
})

850 ⟶ buffer->add_read_pattern({
  For i in (0 until 4)
    For j in (0 until 5 by 1)
860 ⟶       Addr[0] = 1 + i ⟵840B
      Addr[1] = 1 + 4 - j
})

RepeatView

Repeat view also updates the signal
used for stage flow control

```
800
     buffer->view<RepeatView>(num_repeat=2)->
     add_read_pattern({         820        830
         For i in (0 until 4)
             For j in (0 until 5 by 1)
810              Addr[0] = i
                 Addr[1] = 4 - j
     })
850
     buffer->add_read_pattern({
910     For k in (0 until 2)
           For i in (0 until 4)
              For j in (0 until 5 by 1)
860              Addr[0] = i
                 Addr[1] = 4 - j
     })
```

TemporalTileView

```
800 ─▶
    buffer->view<TemporalTileView>(dims = [0,1] Num_tiles = [3, 2])->
       add_read_pattern({           ↖820                    ↖830
          For i in (0 until 5)
810 ─▶       For j in (0 until 5 by 1)
                Addr[0] = i
                Addr[1] = 4 - j
850 ─▶ })

buffer->add_read_pattern({
       For i_tile in (0 until 15 by 5)
1010 ─▶  For j_tile in (0 until 10 by 5)
          For i in (0 until 5)
860 ─▶     For j in (0 until 5 by 1)
                Addr[0] = i_tile + i
                Addr[1] = j_tile + 4 - j
    })
```

Full Tensor

```
800
       buffer->view<Permuteview>([0,1])->add_read_pattern({
           For i in range(0 until 5)    820   830
               For j in range(0 until 2)
810                Addr[0] = i    840A
                   Addr[1] = 1 - j
       });
850
       buffer->add_read_pattern({
           For i in range(0 until 5)
               For j in range(0 until 2)
860                Addr[0] = 1-j
                   Addr[1] = i    840B
       });
```

```
800 —▸
    buffer->view<RollView>(dim=[1], roll_amt=[-3])->add_read_pattern({
        For i in range(0 until 5)   ◂—820  ◂—830
810 —▸  For j in range(0 until 2)
            Addr[0] = i   ◂—840A
            Addr[1] = 1 - j
850 —▸ });

buffer->add_read_pattern({
        For i in range(0 until 5)
860 —▸  For j in range(0 until 2)
            Addr[0] = i
            Old_addr = 1 - j   ◂—840B
            Addr[1] = (old_addr < 3 ? old_addr + 5 : old_addr) - 3
    });
```

```
// Views are stackable/composable
buffer->view<RepeatView>(num_repeat)
       ->view<SliceView>(bounding_bix)
       ->add_read_pattern(...)

// Views can be on write side or on the read side
Buffer = // [3x4]
buffer->view<PermuteView>([0,1])->add_write_pattern()
// write buffer as if it's a [4x3] tensor
```

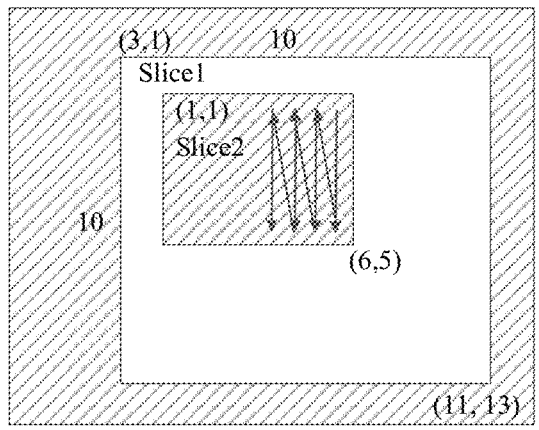

Stack Two 'SliceViews'

```
// Read Pattern on the slice:
Buffer
->view<SliceView>([3,1], [11,13])
->view<SliceView>([1,1], [6,5])->
add_read_pattern({
    For i in (0 until 4 by 1)
        For j in (0 until 5 by 1)
            Addr[0] = i
            Addr[1] = 4 – j
})

// Inner View Transformation, addr relative to inner view
buffer->add_read_pattern({
For i in (0 until 4)
    For j in (0 until 5 by 1)
        Addr[0] = 1 + i
        Addr[1] = 1 + 4 – j
})

// OuterView Translation, addr relative to full buffer
buffer->add_read_pattern({
For i in (0 until 4)              ←— 850
    For j in (0 until 5 by 1)     ←— 840B
        Addr[0] = 1 + 1 + i = i + 2
        Addr[1] = 3 + 1 + 4 - j = 8 – j
})
```

FIG. 16

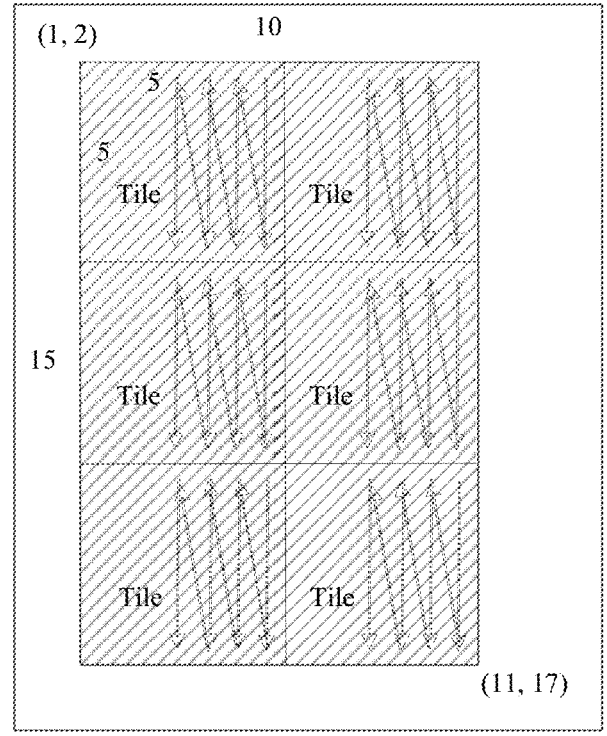

```
// Read Pattern on the slice:
Buffer
->view<SliceView>([1, 2], [11, 17])
->view<TemporalTileView>(dims = [0, 1]
Num_slices = [3, 2])->
add_read_pattern({
  For i in (0 until 5)
      For j in (0 until 5 by 1)
          Addr[0] = i
          Addr[1] = 4 - j
})

// Inner TemporalTileViwe Transformation:
buffer->add_read_pattern({
  For i_tile in (0 until 15 by 5)
   For j_tile in (0 until 10 by 5)
      For i in (0 until 5)
        For j in (0 until 5 by 1)
            Addr[0] =i_tile + i
            Addr[1] = j_tile + 4 - j
})

// Outer SliceView Transformation
buffer->add_read_pattern({
  For i_tile in (0 until 15 by 5)  ← 850
   For j_tile in (0 until 10 by 5)
      For i in (0 until 5)
        For j in (0 until 5 by 1)   ← 840B
            Addr[0] =i_tile + i + 1
            Addr[1] = j_tile + 6 - j
})
```

FIG. 17

INTEGRATING BUFFER VIEWS INTO BUFFER ACCESS OPERATIONS IN A COARSE-GRAINED RECONFIGURABLE COMPUTING ENVIRONMENT

RELATED APPLICATIONS AND DOCUMENTS

This application claims the benefit of (priority to) U.S. Provisional Patent Application No. 63/336,910, filed Apr. 29, 2022, entitled "INTEGRATING BUFFER VIEWS INTO BUFFER ACCESS OPERATIONS IN A COARSE-GRAINED RECONFIGURABLE COMPUTING ENVIRONMENT,". This application is also related to the following papers and commonly owned applications:

Zhang et al., "SARA: Scaling a Reconfigurable Dataflow Accelerator," 2021 ACM/IEEE 48th Annual International Symposium on Computer Architecture (ISCA), 2021, pp. 1041-1054;

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 17/326,128, filed May 20, 2021, entitled "COMPILER FLOW LOGIC FOR RECONFIGURABLE ARCHITECTURES,";

U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/890,841, filed Jun. 2, 2020, entitled "ANTI-CONGESTION FLOW CONTROL FOR RECONFIGURABLE PROCESSORS,";

U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION,";

U.S. Nonprovisional patent application Ser. No. 17/216,647, filed Mar. 29, 2021, entitled "TENSOR PARTITIONING AND PARTITION ACCESS ORDER,";

U.S. Nonprovisional patent application Ser. No. 17/216,650, filed Mar. 29, 2021, entitled "MULTI-HEADED MULTI-BUFFER FOR BUFFERING DATA FOR PROCESSING,";

All of the related applications and documents listed above are hereby incorporated by reference herein for all purposes.

BACKGROUND

The present subject matter relates to buffer access operations in a coarse-grained reconfigurable computing environment.

Reconfigurable processors can be configured to implement a variety of functions more efficiently or faster than might be achieved using a general-purpose processor executing a computer program. So called coarse-grained reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Despite the foregoing advances, efficient data access presents a challenge for reconfigurable coarse-grained computing systems.

SUMMARY

A method for integrating buffer views into buffer access operations in a reconfigurable computing environment includes detecting, in an instruction stream for a reconfigurable dataflow unit (RDU), a buffer allocation statement comprising a tensor indexing expression, a buffer view indicator and one or more buffer view parameters. The method also includes lowering the buffer view parameters into the indexing expression according to the buffer view indicator to produce a modified tensor indexing expression, removing the buffer view indicator from the buffer allocation statement to produce a modified buffer allocation statement and allocating a buffer according to the modified buffer allocation statement. The modified buffer allocation statement may include the modified tensor indexing expression. A corresponding computer readable medium for executing the above method is also disclosed herein.

A system for integrating buffer views into buffer access operations in a reconfigurable computing environment includes an allocation statement detector configured to detect, in an instruction stream for a reconfigurable dataflow unit (RDU), a buffer allocation statement comprising a tensor indexing expression, a buffer view indicator and one or more buffer view parameters and an allocation statement modifier configured to lower the buffer view parameters into the indexing expression according to the buffer view indicator to produce a modified tensor indexing expression. The allocation statement modifier may be further configured to remove the buffer view indicator from the buffer allocation statement to produce a modified buffer allocation statement comprising the modified tensor indexing expression. The system may also include a buffer allocation module configured to allocate a buffer according to the modified buffer allocation statement.

BRIEF DESCRIPTION OF THE DRAWINGS

FIG. 16 shows one example of modifying a buffer allocation statement for two stacked SliceView' buffer views.

FIG. 17 shows one example of modifying a buffer allocation statement for stacked 'SliceView' and 'TemporalTileView' buffer views.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

FIGS. 1-5 depict at least one example of an environment wherein the technology presented herein may be deployed while FIGS. 6-15 depict details on various examples of the technology presented herein.

Figure 1A:
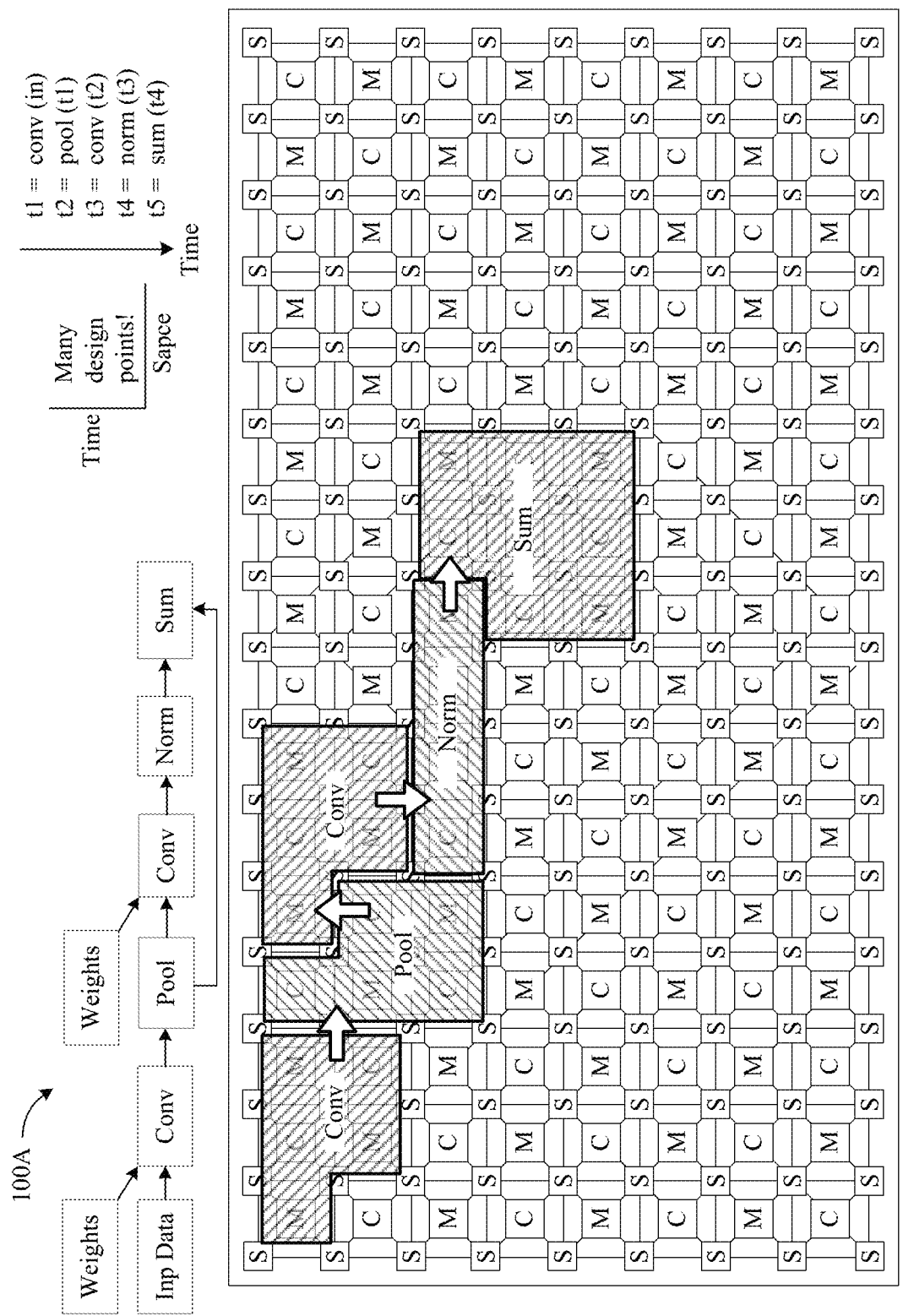
FIG. 1A is a layout diagram illustrating a CGRA (Coarse-Grained Reconfigurable Architecture) suitable for dataflow computing.
Figure 1B:
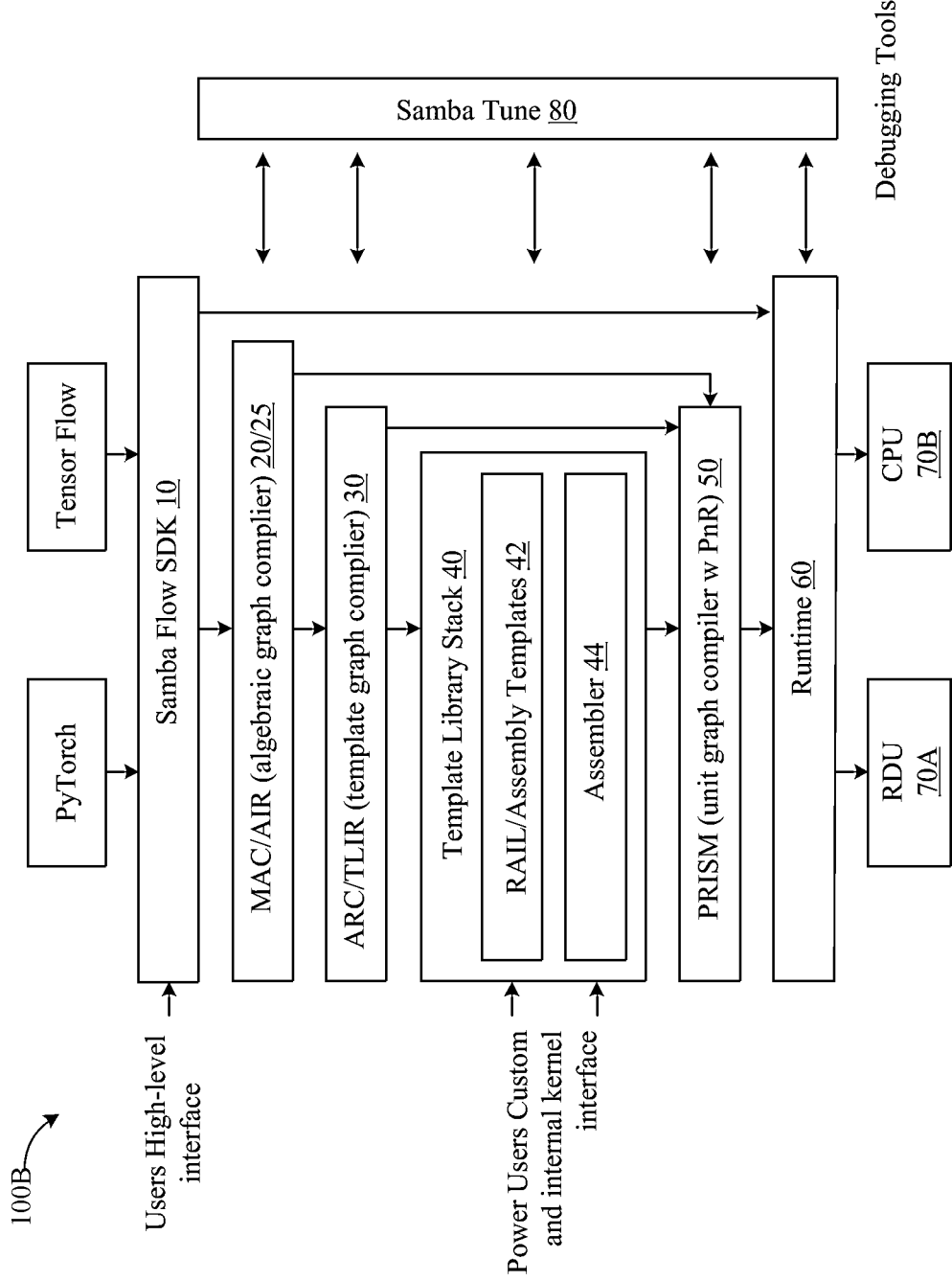
FIG. 1B is a block diagram of a compiler stack suitable for a CGRA (Coarse-Grained Reconfigurable Architecture).

Referring now to FIGS. 1A and 1B, FIG. 1A is a layout diagram illustrating a CGRA (Coarse Grain Reconfigurable Architecture) 100A suitable for dataflow computing. The depicted CGRA comprises compute units and memory units interleaved into a computing grid. The compute units and memory units as well as address generation units (not shown in FIG. 1A) may be reconfigurable units that support dataflow computing. One or more instances of the depicted CGRA computing grid along with some external communication ports (not shown) may be integrated into a computational unit referred to as an RDU (Reconfigurable Dataflow Unit).

The architecture, configurability and dataflow capabilities of the CGRA enables increased computing power that supports both parallel and pipelined computation. Consequently, the CGRA represents a computing paradigm shift that provides unprecedented processing power and flexibility. Leveraging the parallel, pipelined and reconfigurable aspects of the CGRA adds new dimensions of complexity that requires a fundamentally new instruction compilation process and software stack.

While traditional compilers sequentially map operations to processor instructions, typically without regard to pipeline utilization and duration (a task usually handled by the hardware), the course-grained reconfigurable computing grid requires mapping operations to processor instructions in both time and space. Furthermore, while communication through the memory hierarchy of traditional (e.g., von Neumann) computers is implicitly sequential and handled by hardware, dataflow compilers map both sequential (including pipelined) operations and parallel operations to instructions in time and in space and may also program the communication between the compute units and memory units.

The depicted example, which illustrates typical machine learning operations on images, includes two stages of convolution operations that are augmented with a pooling stage, a normalization stage, and a summing stage. One of skill in the art will appreciate that the depicted stages may be used as a highly efficient pipeline if the throughputs of the stages are appropriately matched. One of skill in the art will also appreciate that other operations and tasks may be executing in parallel to the depicted operations and that the allocation of resources must be spatially and temporally coordinated. Consequently, compiler (and optionally programmer) assignment of compute and memory resources to the various stages of processing (both spatially and temporally) has a direct effect on resource utilization and system performance.

FIG. 1B is a block diagram of a compiler stack 100B suitable for a CGRA (Coarse Grain Reconfigurable Architecture). As depicted, the compiler stack 100B includes a number of stages or levels that convert high-level algorithmic expressions and functions (e.g., PyTorch and TensorFlow expressions and functions) to configuration instructions for the reconfigurable units of the CGRA.

The SambaFlow SDK 10 converts user selected and configured algorithms and functions from high-level libraries such as PyTorch and TensorFlow to computational graphs. The nodes of the computational graphs are intrinsically parallel unless a dependency is indicated by an edge in the graph.

The MAC (Model Analyzer and Compiler) level 20 makes high-level mapping decisions for (sub-graphs of the) computational graphs based on hardware constraints. The depicted example supports various application frontends such as Samba, JAX, and TensorFlow/HLO. The MAC may also transform the graphs via autodiff and GradNorm, perform stitching between sub-graphs, interface with template generators for performance/latency estimation, convert Samba operations to AIR (Arithmetic/Algebraic Intermediate Representation) operations, perform tiling, sharding and section cuts and model/estimate the parallelism that can be achieved on the computational graphs.

The AIR level 25 translates high-level graph and mapping decisions provided by the MAC level into explicit TLIR (Template Library Intermediate Representation) graphs. The key responsibilities of the AIR level 25 include legalizing the graph and mapping decisions of the MAC, expanding data parallel, tiling, metapipe, region, and hypersection instructions provided by the MAC, converting AIR operations to TLIR operations, inserting stage buffers and skip buffers, eliminating redundant operations, buffers and sections and optimizing for resource use, latency, and throughput.

The ARC level 30 translates mid-level (e.g., TLIR) graphs provided by AIR into Prism source code optimizing for the target hardware architecture and legalizes the dataflow graph through each performed step. The translating is accomplished by converting IR (intermediate representation) operations to appropriate Prism/RAIL (RDU Abstract Intermediate Language) templates, stitching templates together with data-flow and control-flow, inserting necessary buffers and layout transforms, generating test data and optimizing for resource use, latency, and throughput.

The template library stack (or RAIL layer) 40 provides a library of templates 42 and functions to leverage those templates. The templates 42 are containers for common operations. Templates may be implemented using Assembly or RAIL. While RAIL is similar to Assembly in that memory units and compute units are separately programmed, RAIL provides a higher level of abstraction and compiler intelligence via a concise performance-oriented DSL (Domain Specific Language) for RDU templates. RAIL enables template writers and external power users to control the interactions between the logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs). RAIL also enables event handle allocation.

The Assembler level 44 provides an architecture agnostic low-level programming model as well as optimization and code generation for the target hardware architecture. Responsibilities of the Assembler include address expression compilation, intra-unit resource allocation and management, legalization with target-specific rules, low-level architecture-specific transformations and optimizations, and architecture-specific code generation.

The Prism layer 50 translates ARC template graphs to a physical chip mapping, generates code for the target hardware architecture, legalizes and lowers dataflow graphs to the physical network (e.g., PCUs, PMUs and switches) and produces PEF (Processor Executable Format) files. The Prism layer 50 also conducts PNR (Place and Route) by generating bandwidth calculations, determining the placement of PMUs and PCUs, allocating AGCUs (address generation control units) and VAGs (Virtual Address Generators), selecting PCM/PCU ports and generating configuration information for compute grid switches to enable data routing.

The runtime layer 60 controls execution of the physical level dataflow graphs on actual hardware such the RDU 70A and/or CPU 70B. SambaTune 80 is a set of debugging tools that can facilitate users to perform deadlock and performance debugging RDUs. SambaTune 80 can summarize and visualize instrumentation counters from the RDU that can guide users to identify performance bottlenecks and eliminate by tuning various control parameters.

Array Level Network (ALN)—A Flexible Network for Dataflow Processing

Referring now to FIG. 1C through FIG. 5 generally, a tile of a coarse-grain reconfigurable architecture (CGRA) is based on an array of fused compute-memory units (FCMUs), pattern memory units (PMUs), and/or pattern compute units (PCUs) arranged in two dimensions, M×N. Unless clearly noted from context, any reference to a FCMU, PCU, or PMU may refer to one or more of the other units. The communication between a set of FCMUs is performed over a (M+1)×(N+1) switch fabric called the array-level network (ALN) where each switch has connections to its neighboring FCMUs and to neighboring switches in each of the four directions.

The ALN includes three physical networks—Vector, Scalar and Control. The vector network and scalar networks are packet switched whereas the control network is circuit switched. Each vector packet consists of a vector payload and a header that includes information such as the packet's destination, sequence ID, virtual channel (aka flow control class) etc. Each scalar packet contains a word (32-bits) of payload and a header containing the packet's destination and the packet's type. The Control network consists of a set of single bit wires where each wire is pulsed to transmit a specific control token providing distributed control to orchestrate the execution of a program across multiple FMCUs. The scalar network can also be used to carry control information by overloading a scalar packet using its packet type field.

Parallel Applications such as Machine Learning, Analytics, and Scientific Computing require different types of communication between the parallel compute units and the distributed or shared memory entities. These types of communication can be broadly classified as point-to-point, one-to-many, many-to-one and many-to-many. The ALN enables these communication types through a combination of routing, packet sequence ID and flow control.

Routing of packets on the vector and scalar networks is done using two mechanisms—2D Dimension Order Routing (DOR) or using a software override using Flows. Flows can be used for multiple purposes such as to perform overlap-free routing of certain communications and to perform a multicast from one source to multiple destinations without having to resend the same packet, once for each destination.

Sequence ID based transmissions allow the destination of a many-to-one communication to reconstruct the dataflow order without having to impose restrictions on the producer/s. The packet switched network provides two flow control classes—end to end flow controlled and locally flow controlled. The former class of packet, VC_B, is released by a producer only after ascertaining that the consumer has space for it. The latter class of packet, VC_A, is loosely flow controlled and released into the network without knowing if the receiver has space for it. VC_A packets are used for performance critical communication where a non-overlapping route can be provided between the producer and consumer.

The core component of the ALN is the ALN switch. A packet or control pulse enters the ALN through an interface between the producing FCMU(X) and one of its adjacent switches. While in the ALN, the packet/pulse takes some number of hops until it reaches a switch adjacent to the consumer FCMU (Y). Finally, it takes the interface to Y to complete the route.

When a packet reaches a switch's input port, it is first inspected to see if it should be dimension order routed or flow routed. If it is the former, the destination ID is mapped to a unique output port. If it is the latter, the flow ID of the incoming packet is used to index into a table that identifies the output ports to route the packet to.

Packets from the two different flow control classes, VC_A and VC_B, are managed differently at the source port of every switch. Since VC_B packets are end-to-end flow controlled, they are always allowed to make forward progress through it regardless of the blocking conditions on VC_A packets.

Figure 1C:
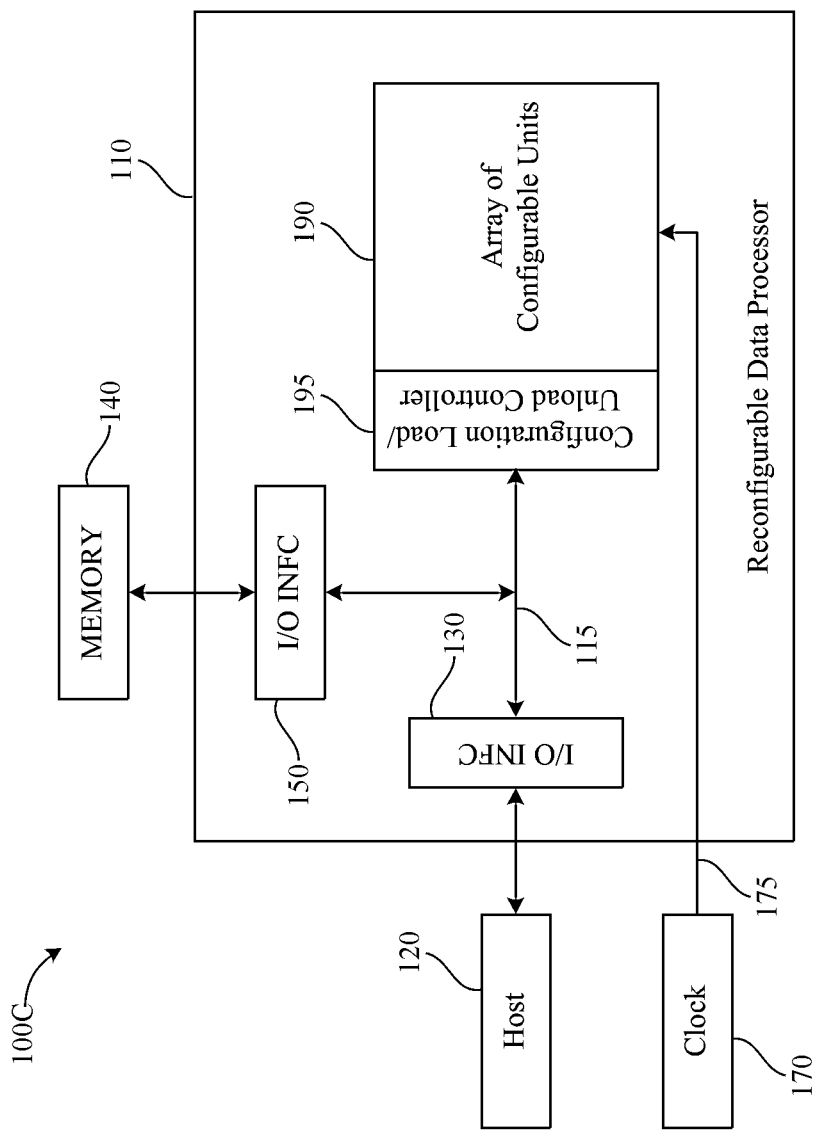
FIG. 1C is a system diagram illustrating a system including a host, a memory, and a reconfigurable data processor.

FIG. 1C is a system diagram illustrating a system 100C including a host 120, a memory 140, and a reconfigurable data processor 110. As shown in the example of FIG. 1C, the reconfigurable data processor 110 includes an array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources or may be implemented using shared logic and data path resources as suits a particular example. In some examples, a system may include only a configuration load controller of the types described herein. In some examples, a system may include only a configuration unload controller of the types described herein.

The processor 110 includes an external I/O interface 130 connected to the host 120, and external I/O interface 150 connected to the memory 140. The I/O interfaces 130, 150 connect via a bus system 115 to the array 190 of configurable units and to the configuration load/unload controller 195. The bus system 115 may have a bus width that carries one chunk of data, which can be for this example 128 bits (references to 128 bits throughout can be considered as an example chunk size more generally). In general, a chunk of the configuration file can have N bits of data, and the bus system can be configured to transfer N bits of data in one bus cycle, where N is any practical bus width. A sub-file distributed in the distribution sequence can consist of one chunk, or other amounts of data as suits a particular example. Procedures are described herein using sub-files consisting of one chunk of data each. Of course, the technology can be configured to distribute sub-files of different sizes, including sub-files that may consist of two chunks distributed in two bus cycles for example.

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence as described herein to configurable units in the array 190 of configurable units in the reconfigurable data processor 110.

An external clock generator 170 or other clock signal sources can provide a clock signal 175 or clock signals to elements in the reconfigurable data processor 110, including the array 190 of configurable units, and the bus system 115, and the external data I/O interfaces 130 and 150.

Figure 2:
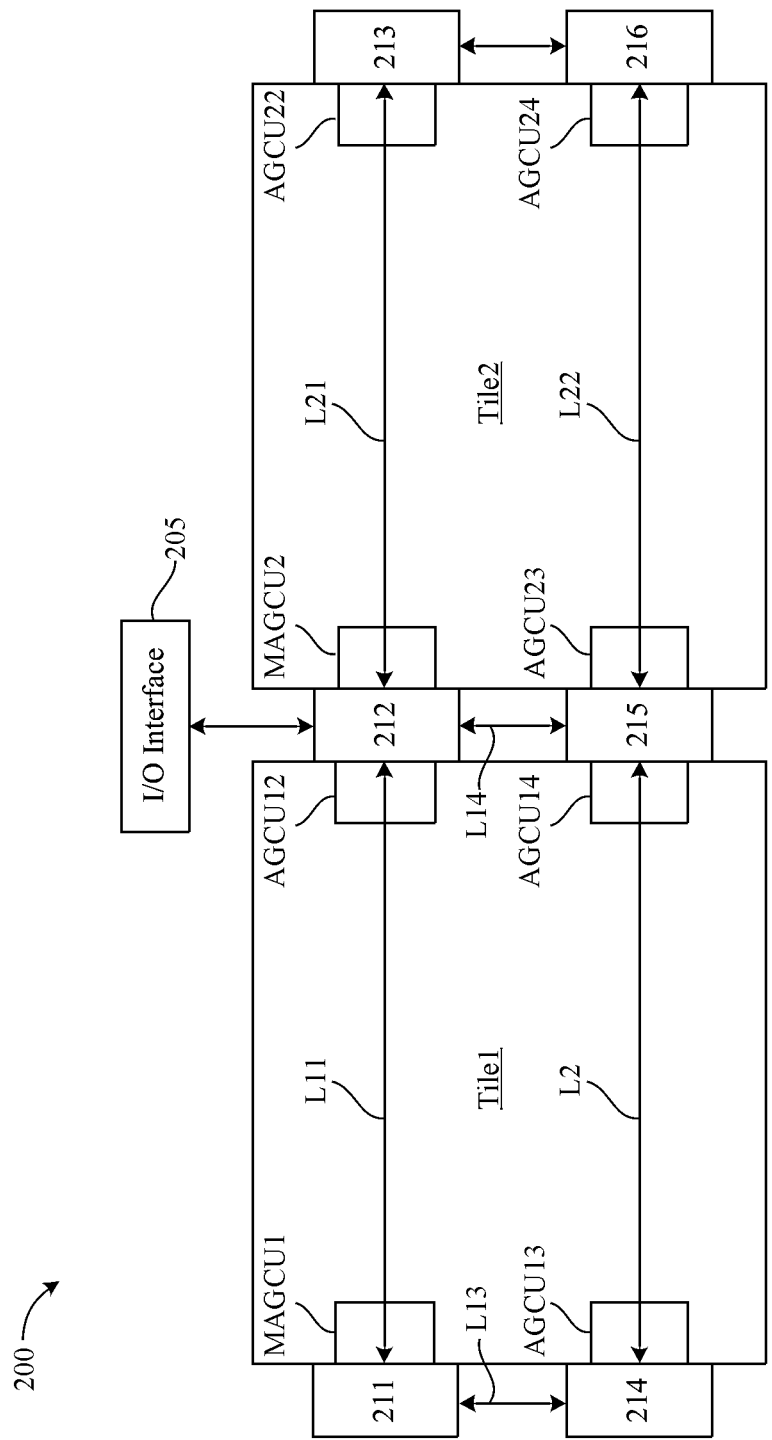
FIG. 2 is a simplified block diagram of a top-level network and components of a CGRA (Coarse Grain Reconfigurable Architecture).

FIG. 2 is a simplified block diagram of components of a CGRA (Coarse Grain Reconfigurable Architecture) processor 200. In this example, the CGRA processor 200 has 2 tiles (Tile1, Tile2). Each tile comprises an array of configurable units connected to a bus system, including an array level network (ALN) in this example. The bus system includes a top-level network connecting the tiles to external I/O interface 205 (or any number of interfaces). In other examples, different bus system configurations may be utilized. The configurable units in each tile are nodes on the ALN in this example.

In the depicted example, each of the two tiles has 4 AGCUs (Address Generation and Coalescing Units) (e.g. MAGCU1, AGCU12, AGCU13, AGCU14). The AGCUs are nodes on the top-level network and nodes on the ALNs and include resources for routing data among nodes on the top-level network and nodes on the ALN in each tile.

Nodes on the top-level network in this example include one or more external I/O, including interface 205. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other examples, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other examples, a configuration load/unload controller can be designed for loading and unloading configurations for more than one tile. In other examples, more than one configuration controller can be designed for configuration of a single tile. Also, the configuration load/unload controller can be implemented in other portions of the system, including as a stand-alone node on the top-level network and the ALN or networks.

The top-level network is constructed using top-level switches (211-216) connecting to each other as well as to other nodes on the top-level network, including the AGCUs, and I/O interface 205. The top-level network includes links (e.g. L11, L12, L21, L22) connecting the top-level switches. Data travel in packets between the top-level switches on the links, and from the switches to the nodes on the network connected to the switches. For example, top-level switches 211 and 212 are connected by a link L11, top-level switches 214 and 215 are connected by a link L12, top-level switches 211 and 214 are connected by a link L13, and top-level switches 212 and 213 are connected by a link L21. The links can include one or more buses and supporting control lines, including for example a chunk-wide bus (vector bus). For example, the top-level network can include data, request, and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 211, 212, 214 and 215 are connected to MAGCU1, AGCU12, AGC U13 and AGCU14 in the tile Tile1, respectively. Top-level switches 212, 213, 215 and 216 are connected to MAGCU2, AGCU22, AGCU23 and AGCU24 in the tile Tile2, respectively. Top-level switches can be connected one or more external I/O interfaces (e.g. interface 205).

Figure 3B:
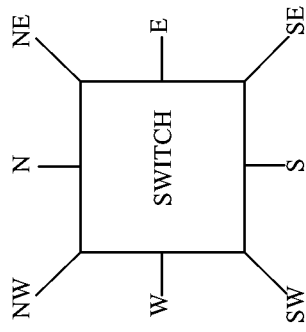
FIG. 3B illustrates an example switch unit connecting elements in an array level network.
Figure 3A:
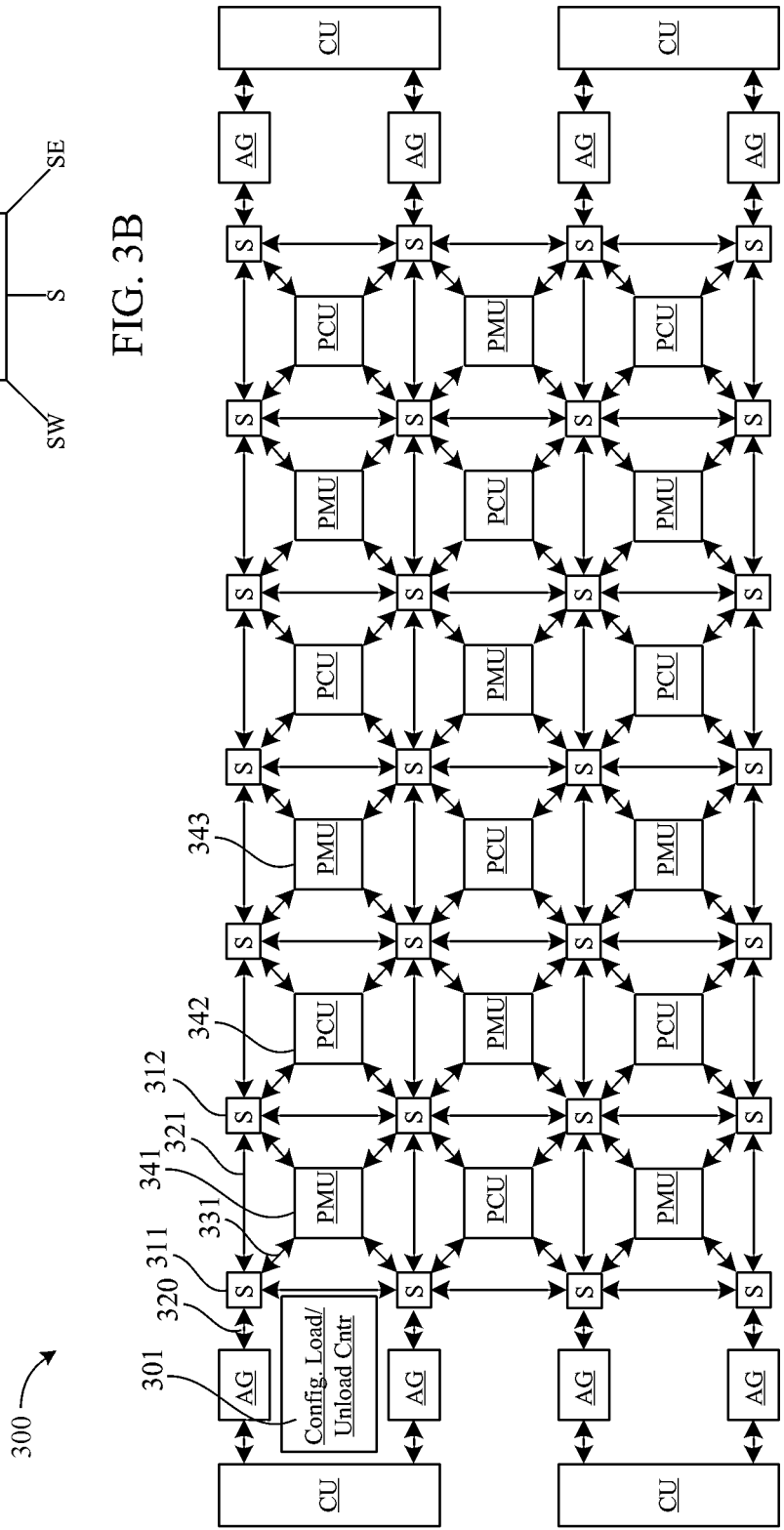
FIG. 3A is a simplified diagram of a tile and an array level network usable in the configuration of FIG. 2, where the configurable units are nodes on the array level network.

FIG. 3A is a simplified diagram of a tile and an ALN usable in the configuration of FIG. 2, where the configurable units in the array are nodes on the ALN. In this example, the array of configurable units 300 includes a plurality of types of configurable units. The types of configurable units in this example, include Pattern Compute Units (PCU), such as PCU 342, Pattern Memory Units (PMU), such as PMUs 341, 343, switch units (S), such as switch units 311, 312, and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The ALN includes links interconnecting configurable units in the array. The links in the ALN include one or more and, in this case three, kinds of physical buses: a chunk-level vector bus (e.g. 128 bits of data), a word-level scalar bus (e.g. 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one example, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:
  A bit to indicate if the chunk is scratchpad memory or configuration store data.
  Bits that form a chunk number.
  Bits that indicate a column identifier.
  Bits that indicate a row identifier.
  Bits that indicate a component identifier.

For a load operation, the configuration load controller can send N chunks to a configurable unit in order from N−1 to 0. For this example, the 6 chunks are sent out in most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 3B illustrates an example switch unit connecting elements in an ALN. As shown in the example of FIG. 3B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the ALN.

In examples described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the ALN. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 311, and a link 331 between the Southeast (SE) vector interface of the switch unit 311 and the PMU 341.

Figure 4:
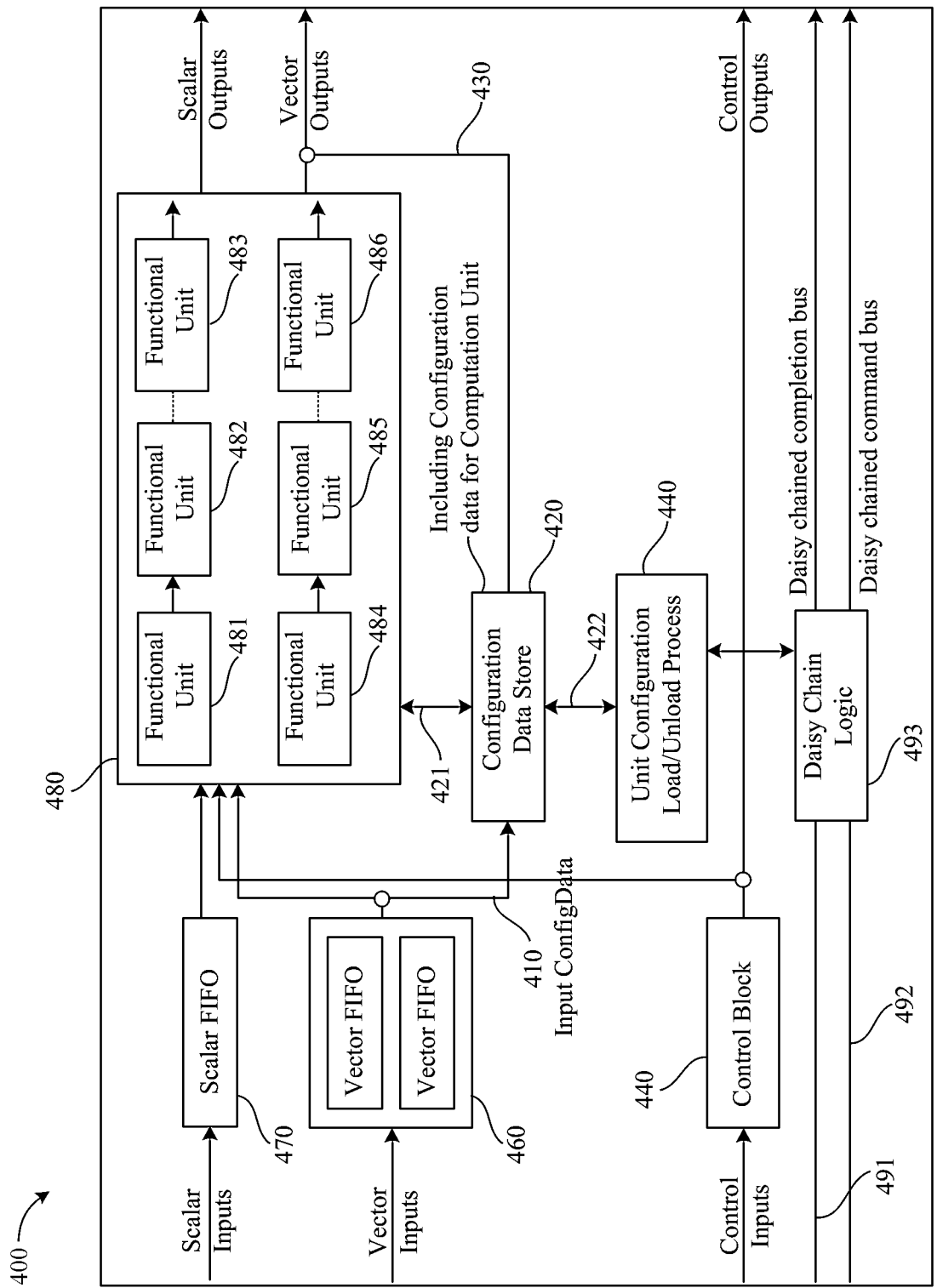
FIG. 4 is a block diagram illustrating an example configurable unit, such as a Pattern Compute Unit (PCU).

In this example, one of the AGCUs is configured to be a master AGCU, which includes a configuration load/unload controller (e.g. 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the ALN to the corresponding configurable unit according to a distribution sequence described herein.

In one example, in a way that can reduce the wiring requirements within a configurable unit, configuration and status registers holding unit files to be loaded in a configuration load process or unloaded in a configuration unload process in a component are connected in a serial chain and can be loaded through a process of shifting bits through the serial chain. In some examples, there may be more than one serial chain arranged in parallel or in series. When a configurable unit receives, for example, 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

FIG. 4 is a block diagram illustrating an example configurable unit 400, such as a Pattern Compute Unit (PCU). A configurable unit can interface with the scalar, vector, and control buses, in this example using three corresponding sets of inputs and outputs: scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 470, and control outputs are provided by the control block 470.

Each vector input is buffered in this example using a vector FIFO in a vector FIFO block 460 which can include one or more vector FIFOs. Likewise in this example, each scalar input is buffered using a scalar FIFO 450. Using input FIFOs decouples timing between data producers and consumers and simplifies inter-configurable-unit control logic by making it robust to input delay mismatches.

A configurable unit includes multiple reconfigurable datapaths in block 480. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 480 via line 421.

A configurable datapath organized as a multi-stage pipeline can include multiple functional units (e.g. 481, 482, 483; 484, 485, 486) at respective stages. A special functional unit SFU (e.g. 483, 486) in a configurable datapath can include a configurable module that comprises sigmoid circuits and other specialized computational circuits, the combinations of which can be optimized for particular implementations. In one example, a special functional unit can be at the last stage of a multi-stage pipeline and can be configured to receive an input line X from a functional unit (e.g. 482, 486) at a previous stage in a multi-stage pipeline. In some examples, a configurable unit like a PCU can include many sigmoid circuits, or many special functional units which are configured for use in a particular graph using configuration data.

Configurable units in the array of configurable units include configuration data stores 420 (e.g. serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving, via the bus system (e.g. the vector inputs), chunks of a unit file particular to the configurable unit and loading the received chunks into the configuration data store 420 of the configurable unit. The unit file loaded into the configuration data store 420 can include configuration data, including opcodes and routing configuration, for circuits implementing a matrix multiply as described with reference to FIGS. 6-12.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 4, a daisy-chained completion bus 491 and a daisy-chained command bus 492 are connected to daisy-chain logic 493, which communicates with the unit configuration load logic 440. The daisy-chain logic 493 can include load complete status logic, as described below. The daisy-chained completion bus is further described below. Other topologies for the command and completion buses are clearly possible but not described here.

Figure 5:
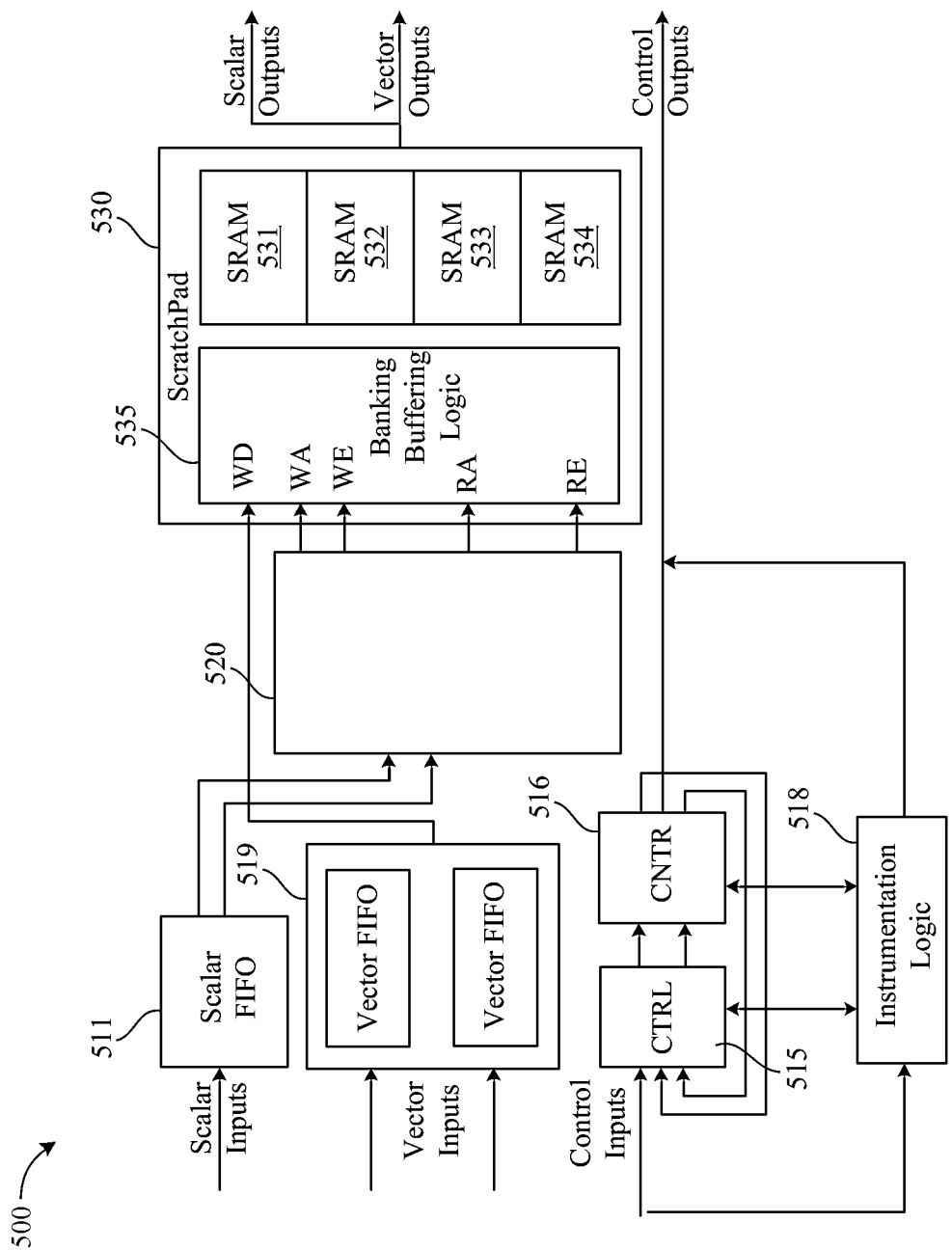
FIG. 5 is a block diagram illustrating another example of a configurable unit, such as a Pattern Memory Unit (PMU).

FIG. 5 is a block diagram illustrating an example configurable pattern memory unit (PMU) including an instrumentation logic unit. A PMU can contain scratchpad memory 530 coupled with a reconfigurable scalar data path 520 intended for address calculation (RA, WA) and control (WE, RE) of the scratchpad memory 530, along with the bus interfaces used in the PCU (FIG. 4). PMUs can be used to distribute on-chip memory throughout the array of reconfigurable units. In one example, address calculation within the memory in the PMUs is performed on the PMU datapath, while the core computation is performed within the PCU.

The bus interfaces can include scalar inputs, vector inputs, scalar outputs and vector outputs, usable to provide write data (WD). The data path can be organized as a multi-stage reconfigurable pipeline, including stages of functional units (FUs) and associated pipeline registers (PRs) that register inputs and outputs of the functional units. PMUs can be used to store distributed on-chip memory throughout the array of reconfigurable units.

A scratchpad is built with multiple SRAM banks (e.g., 531, 532, 533, 534). Banking and buffering logic 535 for the SRAM banks in the scratchpad can be configured to operate in several banking modes to support various access patterns. A computation unit as described herein can include a lookup table stored in the scratchpad memory 530, from a configuration file or from other sources. In a computation unit as described herein, the scalar data path 520 can translate a section of a raw input value I for addressing lookup tables implementing a function f(I), into the addressing format utilized by the SRAM scratchpad memory 530, adding appropriate offsets and so on, to read the entries of the lookup table stored in the scratchpad memory 530 using the sections of the input value I. Each PMU can include write address calculation logic and read address calculation logic that provide write address WA, write enable WE, read address RA and read enable RE to the banking buffering logic 535. Based on the state of the local FIFOs 511 and 519 and external control inputs, the control block 515 can be configured to trigger the write address computation, read address computation, or both, by enabling the appropriate counters 516. A programmable counter chain 516 (Control Inputs, Control Outputs) and control block 515 can trigger PMU execution.

Instrumentation logic 518 is included in this example of a configurable unit. The instrumentation logic 518 can be part of the control block 515 or implemented as a separate block on the device. The instrumentation logic 518 is coupled to the control inputs and to the control outputs. Also, the instrumentation logic 518 is coupled to the control block 515 and the counter chain 516, for exchanging status signals and control signals in support of a control barrier network configured as discussed above.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 6:
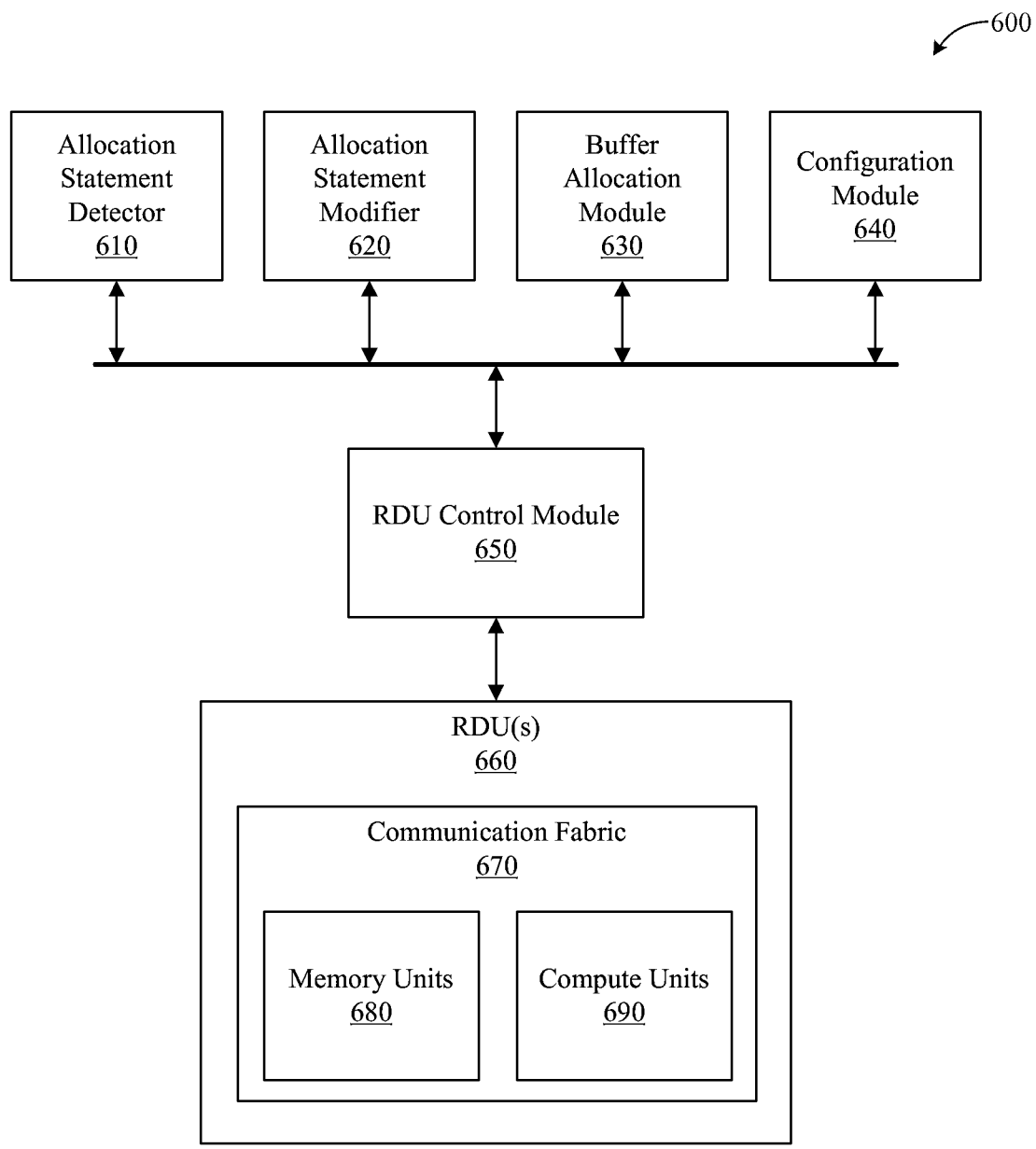
FIG. 6 is a block diagram illustrating one example of a buffer access configuration system suitable for a coarse-grained reconfigurable computing environment.

FIG. 6 is a block diagram illustrating one example of a buffer access configuration system 600 suitable for a coarse-grained reconfigurable computing environment. As depicted, the buffer access configuration system 600 includes an allocation statement detector 610, an allocation statement modifier 620, a buffer allocation module 630, a configuration module 640, an RDU control module 650, and one or more RDUs 660 comprising a communication fabric 670, memory units 680 and compute units 690. The buffer access configuration system 600 enables optimization of buffer access operations and configuring the RDUs to conduct the optimized buffer operations while processing data.

The allocation statement detector 610 may detect a buffer allocation statement within a (text-based or token-based) instruction stream for a reconfigurable dataflow unit (RDU). The allocation statement modifier 620 may modify the buffer allocation statement to optimize buffer-related access. For example, the allocation statement modifier 620 may integrate buffer view (i.e., memory transformation) operations into tensor indexing expressions executed by buffers (via the address generators associated therewith) when providing data to, or receiving data from, one or more compute units.

The buffer allocation module 630 may allocate one or more buffers according to the modified buffer allocation statement. The configuration module 640 may generate configuration information including configuration information for the allocated buffers that leverages the modified buffer allocation statement. The RDU control module 650 may communicate compute unit configuration information and memory unit configuration information (including the buffer configuration information) to the RDU(s) and initiate data flow in the computing grid. The communication fabric 670 may enable communication between the RDU control module 650 and memory units 680 and compute units 690 within the RDU(s) 660.

Figure 7:
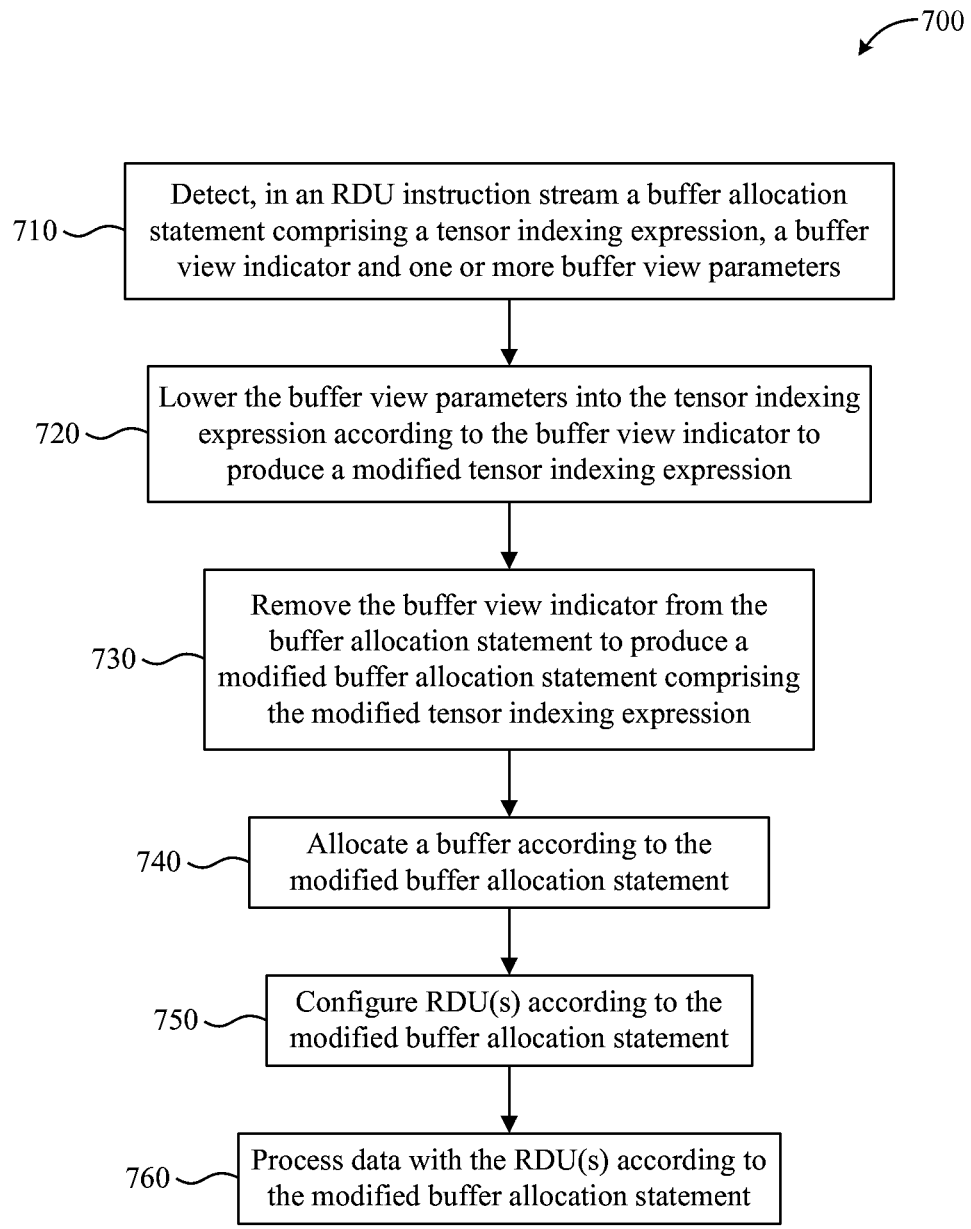
FIG. 7 is a flowchart illustrating one example of a buffer access configuration method suitable for a coarse-grained reconfigurable computing environment.

FIG. 7 is a flowchart illustrating one example of a buffer access configuration method 700 suitable for a coarse-grained reconfigurable computing environment. As depicted, the buffer access configuration method 700 includes detecting (710) a buffer allocation statement, lowering (720) buffer view parameters, removing (730) the buffer view indicator, allocating (740) a buffer, configuring (750) one or more RDUs and processing (760) data with the RDUs. The buffer access configuration method 700 enables integrating buffer views into buffer access operations and processing data using the buffer access operations.

Detecting (710) a buffer allocation statement may include detecting, in an RDU instruction stream, a buffer allocation statement comprising a tensor indexing expression, a buffer view indicator and one or more buffer view parameters. Lowering (720) buffer view parameters may include lowering the buffer view parameters into the tensor indexing expression according to the buffer view indicator to produce a modified tensor indexing expression. Removing (730) the buffer view indicator may produce a modified buffer allocation statement that incorporates the buffer view operations specified by the buffer view indicator and associated parameters within the modified tensor indexing expression.

Subsequent to producing the modified buffer allocation statement the method may continue by allocating (740) a buffer, configuring (750) one or more RDUs and processing (760) data with the RDUs. Each of these steps/operations may be performed according to the modified buffer allocation statement.

Figure 8:
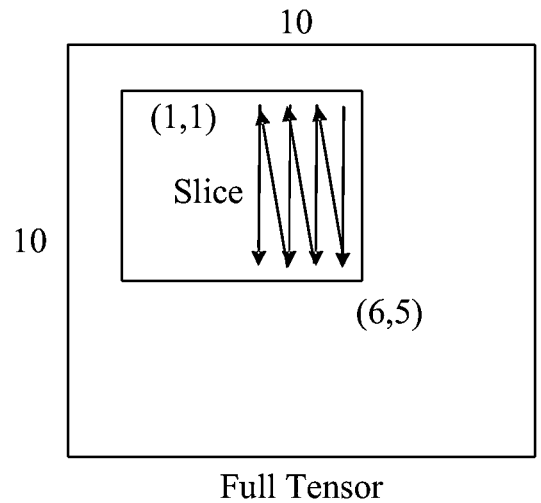
FIG. 8 shows one example of modifying a buffer allocation statement for a 'SliceView' buffer view.

FIG. 8 shows one example of modifying a buffer allocation statement 800 for a 'SliceView' buffer view. As depicted, the buffer allocation statement 800 includes a tensor indexing expression 810 encapsulated within an 'add_read_pattern' function call, a buffer view indicator 820 and buffer view parameters 830. In the depicted example, the buffer view indicator 820 (enclosed within angle brackets) indicates that a 'SliceView' is to be applied to the buffer and the buffer view parameters 830 (enclosed within parenthesis) indicate the extents of the slice to be viewed.

Applying steps 720 and 730 of the method 700 effectively converts the buffer allocation statement 800 to a modified buffer allocation statement 850. The modified buffer allocation statement 850 is produced by lowering the buffer view parameters 830 into the modified tensor indexing expression 860 and deleting the original buffer view indicator 820 and parameters 830. In the depicted example an indexing portion 840 of the tensor indexing expression is modified (from an original indexing portion 840A to an updated indexing portion 840B) to accomplish the buffer view (slicing) operations.

Figure 9:
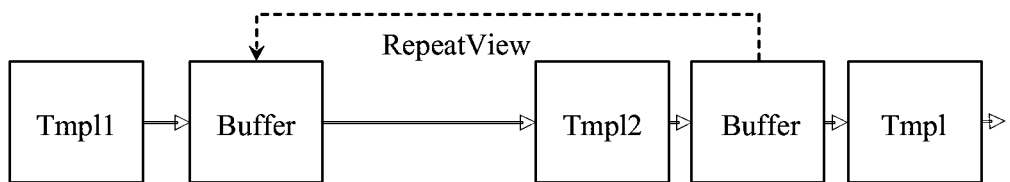
FIG. 9 shows one example of modifying a buffer allocation statement for a 'RepeatView' buffer view.

FIG. 9 shows one example of modifying a buffer allocation statement 800 for a 'RepeatView' buffer view. As depicted, the buffer allocation statement 800 includes a tensor indexing expression 810 encapsulated within an 'add_read_pattern' function call, a buffer view indicator 820 and buffer view parameters 830. In the depicted example, the buffer view indicator 820 (enclosed within angle brackets) indicates that a 'RepeatView' is to be applied to the buffer and the buffer view parameters 830 (enclosed within parenthesis) indicate the number of iterations the view is to be repeated.

Applying steps 720 and 730 of the method 700 effectively converts the buffer allocation statement 800 to a modified buffer allocation statement 850. The modified buffer allocation statement 850 is produced by lowering the buffer view parameters into the modified tensor indexing expression 860 and deleting the original buffer view indicator 820 and parameters 830. In the depicted example, the modified tensor indexing expression 860 includes an outer loop 910 that implements the number of iterations indicated by the buffer view parameters 830.

Figure 10:
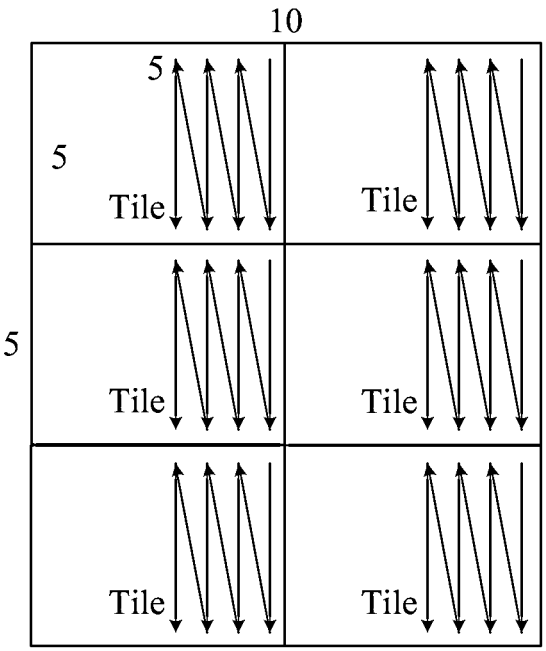
FIG. 10 shows one example of modifying a buffer allocation statement for a 'TemporalTileView' buffer view.

FIG. 10 shows one example of modifying a buffer allocation statement 800 for a 'TemporalTileView' buffer view. As depicted, the buffer allocation statement 800 includes a tensor indexing expression 810 encapsulated within an 'add_read_pattern' function call, a buffer view indicator 820 and buffer view parameters 830. In the depicted example, the buffer view indicator 820 (enclosed within angle brackets) indicates that a 'TemporalTileView' is to be applied to the buffer and the buffer view parameters 830 (enclosed within parenthesis) indicate the dimensions the view is to be applied to and the number of tiles that are to be implemented along each indicated dimension.

Applying steps 720 and 730 of the method 700 effectively converts the buffer allocation statement 800 to a modified buffer allocation statement 850. The modified buffer allocation statement 850 is produced by lowering the buffer view parameters into the modified tensor indexing expression 860 and deleting the original buffer view indicator 820 and parameters 830. In the depicted example, the modified tensor indexing expression 860 includes a set of outer loops 1010 that implement the number of tiling iterations along each dimension as indicated by the buffer view parameters 830.

Figure 11:
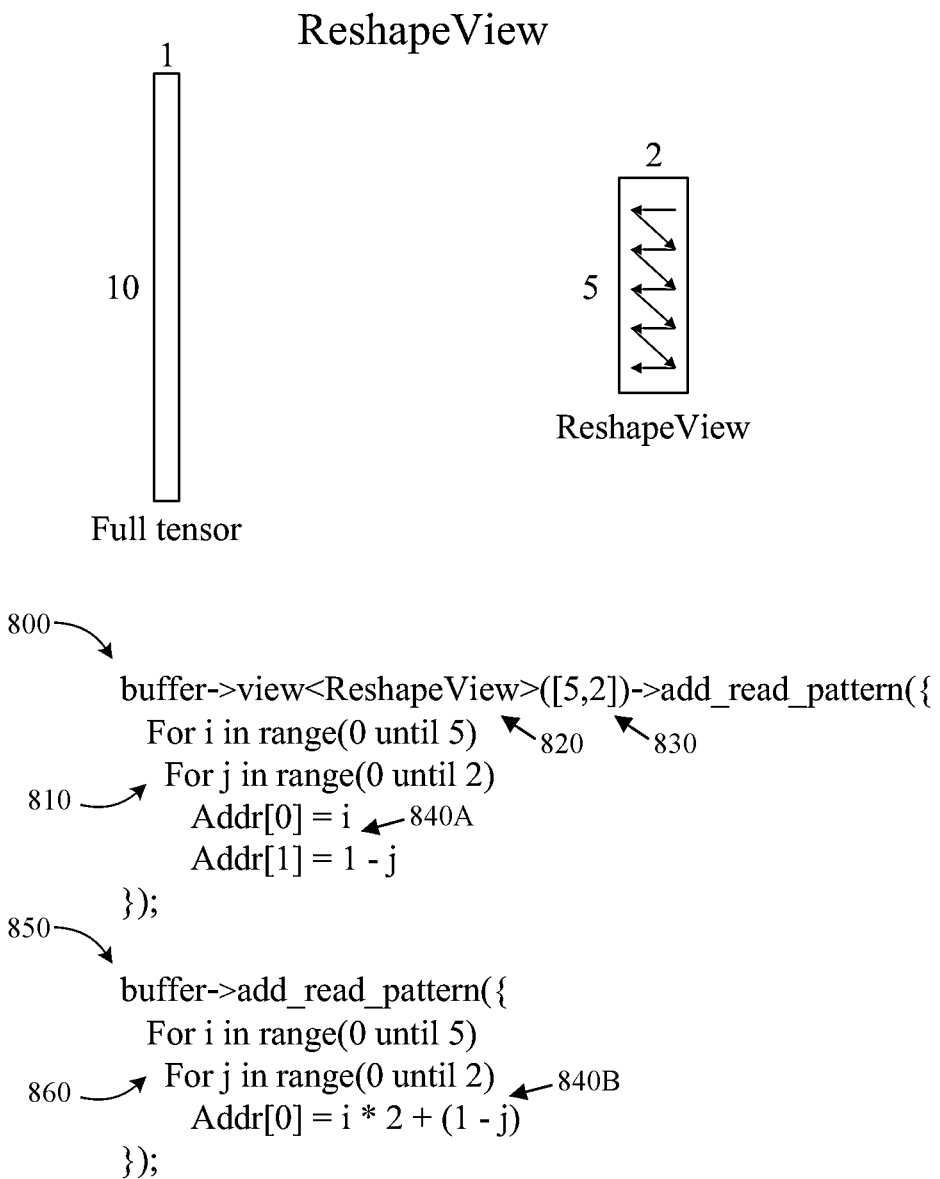
FIG. 11 shows one example of modifying a buffer allocation statement for a 'ReshapeView' buffer view.

FIG. 11 shows one example of modifying a buffer allocation statement 800 for a 'ReshapeView' buffer view. As depicted, the buffer allocation statement 800 includes a tensor indexing expression 810 encapsulated within an 'add_read_pattern' function call, a buffer view indicator 820 and buffer view parameters 830. In the depicted example, the buffer view indicator 820 (enclosed within angle brackets) indicates that a 'ReshapeView' is to be applied to the buffer and the buffer view parameters 830 (enclosed within parenthesis) indicate the desired shape for the view.

Applying steps 720 and 730 of the method 700 effectively converts the buffer allocation statement 800 to a modified buffer allocation statement 850. The modified buffer allocation statement 850 is produced by lowering the buffer view parameters into the modified tensor indexing expression 860 and deleting the original buffer view indicator 820 and parameters 830. In the depicted example an indexing portion 840 of the tensor indexing expression is modified (from an original indexing portion 840A to an updated indexing portion 840B) to accomplish the buffer view (reshaping) operations.

Figure 12:
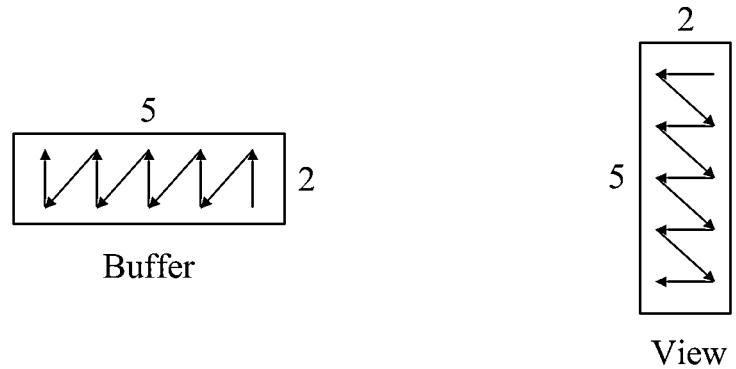
FIG. 12 shows one example of modifying a buffer allocation statement for a 'PermuteView' buffer view.

FIG. 12 shows one example of modifying a buffer allocation statement 800 for a 'PermuteView' buffer view. As depicted, the buffer allocation statement 800 includes a tensor indexing expression 810 encapsulated within an 'add_read_pattern' function call, a buffer view indicator 820 and buffer view parameters 830. In the depicted example, the buffer view indicator 820 (enclosed within angle brackets) indicates that a 'PermuteView' is to be applied to the buffer and the buffer view parameters 830 (enclosed within parenthesis) indicate how the view is to be permuted.

Applying steps 720 and 730 of the method 700 effectively converts the buffer allocation statement 800 to a modified buffer allocation statement 850. The modified buffer allocation statement 850 is produced by lowering the buffer view parameters into the modified tensor indexing expression 860 and deleting the original buffer view indicator 820 and parameters 830. In the depicted example an indexing portion 840 of the tensor indexing expression is modified (from an original indexing portion 840A to an updated indexing portion 840B) to accomplish the buffer view (permute) operations. In the depicted example, the indexing equations are swapped for the two dimensions indicated in the buffer view parameters 830.

Figure 13:
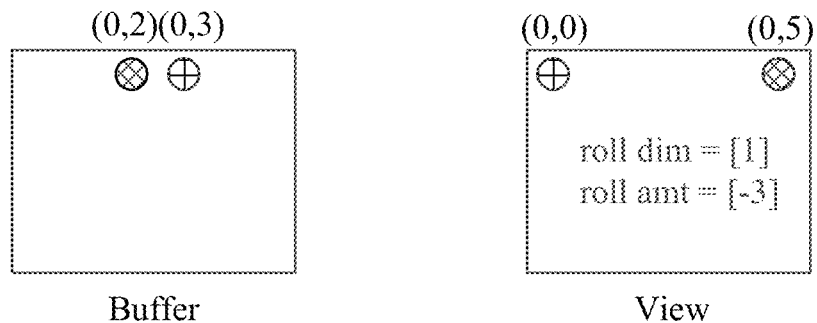
FIG. 13 shows one example of modifying a buffer allocation statement for a 'RollView' buffer view.

FIG. 13 shows one example of modifying a buffer allocation statement for a 'RollView' buffer view. As depicted, the buffer allocation statement 800 includes a tensor indexing expression 810 encapsulated within an 'add_read_pattern' function call, a buffer view indicator 820 and buffer view parameters 830. In the depicted example, the buffer view indicator 820 (enclosed within angle brackets) indicates that a 'RollView' is to be applied to the buffer and the buffer view parameters 830 (enclosed within parenthesis) indicate the rolling dimension and amount.

Applying steps 720 and 730 of the method 700 effectively converts the buffer allocation statement 800 to a modified buffer allocation statement 850. The modified buffer allocation statement 850 is produced by lowering the buffer view parameters into the modified tensor indexing expression 860 and deleting the original buffer view indicator 820 and parameters 830. In the depicted example an indexing portion 840 of the tensor indexing expression is modified (from an original indexing portion 840A to an updated indexing portion 840B) to accomplish the buffer view (roll) operations. In the depicted example, some logic is added to the indexing portion 840B to accomplish the roll consistent with the buffer view parameters 830.

Figures 14, 15:
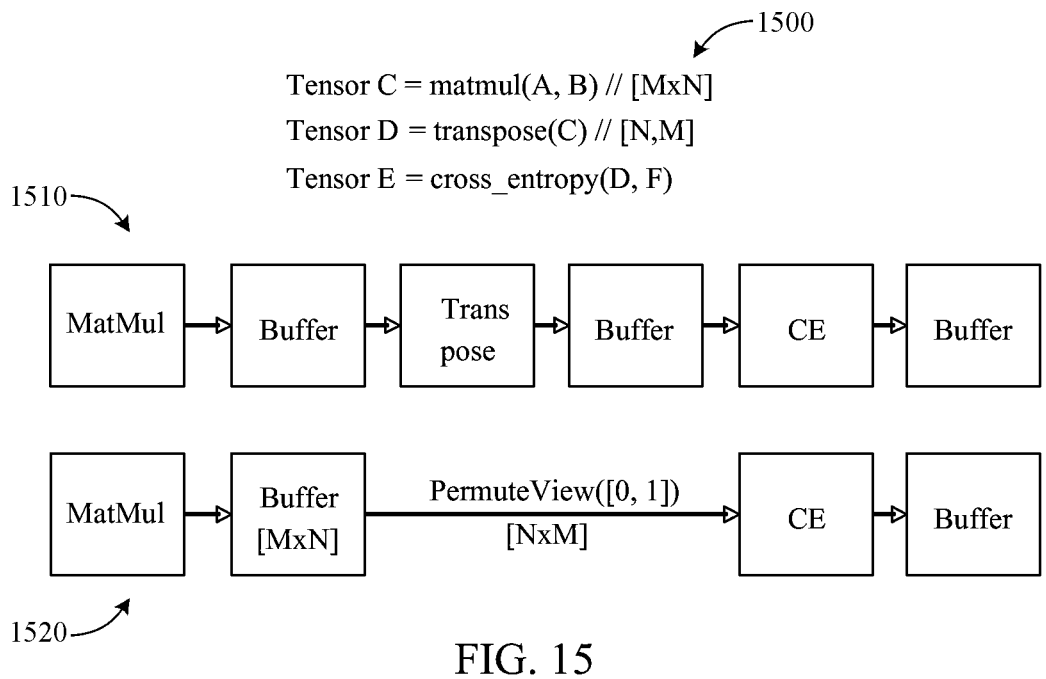
FIG. 14 shows pseudo-code that illustrates how buffer views may be stacked and applied to both buffer read access and buffer write access.
FIG. 15 shows tensor pseudo-code and corresponding pre-optimization and post-optimization pipelines.

FIG. 14 shows pseudo-code 1400 that illustrates how buffer views may be stacked and applied to both buffer read access and buffer write access. In the depicted example, the buffer allocation statement in the upper portion of the figure includes two (cascaded/stacked) views—a 'RepeatView' and a 'SliceView'. In such situations each of the views may be lowered into the tensor indexing expression (not shown). The lower portion of FIG. 14 shows an example where a view is added to a buffer write operation (via an 'add write pattern' function) call in contrast to the previous examples based on buffer read operations.

FIG. 15 shows tensor pseudo-code 1500 and corresponding pre-optimization pipeline 1510 and post-optimization pipeline 1520. In the depicted example, a transpose compute stage and associated output buffer stage within the pre-optimization pipeline 1510 are eliminated in the post-optimization pipeline 1520 via a 'PermuteView' operation onto a buffer read operation that effectively performs the transpose operation on the tensor stored in the input buffer. The 'PermuteView' operation may also be lowered into a tensor indexing expression for the following 'CrossEntropy' stage using the method 700. As is demonstrated by FIG. 15, the methods disclosed herein can potentially eliminate both compute stages and buffer stages in a dataflow computing system within a dataflow compiler.

FIG. 16 shows one example of modifying a buffer allocation statement for two stacked 'SliceView' buffer views. A modified buffer allocation statement 850 is produced by successive lowering of the buffer view parameters of the two 'SliceView' buffer views into a modified tensor indexing expression 840B.

FIG. 17 shows one example of modifying a buffer allocation statement for stacked 'SliceView' and 'TemporalTileView' buffer views. A modified buffer allocation statement 850 is produced by the successive lowering of the buffer view parameters of the 'SliceView' and 'TemporalTileView' buffer views into a modified tensor indexing expression 840B.

The examples disclosed herein include a method (and corresponding computer readable medium) for integrating buffer views into buffer access operations in a reconfigurable computing environment, the method comprising:
- detecting, in an instruction stream for a reconfigurable dataflow unit (RDU), a buffer allocation statement comprising a tensor indexing expression, a buffer view indicator and one or more buffer view parameters
- lowering the buffer view parameters into the indexing expression according to the buffer view indicator to produce a modified tensor indexing expression; and
- removing the buffer view indicator from the buffer allocation statement to produce a modified buffer allocation statement comprising the modified tensor indexing expression
- allocating a buffer according to the modified buffer allocation statement Optional features for the above method include:
- configuring the RDU according to the modified buffer allocation statement
  - wherein configuring the RDU comprises configuring an address generator to execute the modified tensor indexing expression
- processing data with the RDU according to the modified buffer allocation statement
- wherein the buffer view indicator is selected from the group consisting of a slice view indicator, a repeat view indicator, a temporal tile view indicator, a reshape view indicator, a permute view indicator, a layout view indicator and a roll view indicator
- wherein the buffer view indicator is stackable with other buffer view indicators
- wherein the buffer allocation statement specifies a buffer read pattern or a buffer write pattern The examples disclosed herein include a system for integrating buffer views into buffer access operations in a reconfigurable computing environment, the system comprising:
- an allocation statement detector configured to detect, in an instruction stream for a reconfigurable dataflow unit (RDU), a buffer allocation statement comprising a tensor indexing expression, a buffer view indicator and one or more buffer view parameters
- an allocation statement modifier configured to lower the buffer view parameters into the indexing expression according to the buffer view indicator to produce a modified tensor indexing expression
- the allocation statement modifier further configured to remove the buffer view indicator from the buffer allocation statement to produce a modified buffer allocation statement comprising the modified tensor indexing expression
- a buffer allocation module configured to allocate a buffer according to the modified buffer allocation statement Optional features for the above system include:
- an RDU for processing data according to the modified buffer allocation statement
- a configuration module for configuring the RDU according to the modified buffer allocation statement
  - wherein configuring the RDU comprises configuring an address generator to execute the modified tensor indexing expression
- wherein the buffer view indicator is selected from the group consisting of a slice view indicator, a repeat view indicator, a temporal tile view indicator, a reshape view indicator, a permute view indicator, a layout view indicator and a roll view indicator
- wherein the buffer view indicator is stackable with other buffer view indicators
- wherein the buffer allocation statement specifies a buffer read pattern or a buffer write pattern Referring again to (at least) FIG. 4 and as will be appreciated by those of ordinary skill in the art, aspects of the various examples described herein may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "circuit," "circuitry," "module," "computer," "logic," "FPGA," "unit," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

We claim as follows:

1. A system for integrating buffer views into buffer access operations in a reconfigurable computing environment, the system comprising:
    an allocation statement detector configured to detect, in an instruction stream for a reconfigurable dataflow unit (RDU), a buffer allocation statement comprising a tensor indexing expression, a buffer view indicator and one or more buffer view parameters;
    an allocation statement modifier configured to lower the buffer view parameters into the tensor indexing expression according to the buffer view indicator to produce a modified tensor indexing expression;
    the allocation statement modifier further configured to remove the buffer view indicator from the buffer allocation statement to produce a modified buffer allocation statement comprising the modified tensor indexing expression; and
    a buffer allocation module configured to allocate a buffer according to the modified buffer allocation statement.

2. The system of claim 1, further comprising an RDU for processing data according to the modified buffer allocation statement.

3. The system of claim 2, further comprising a configuration module for configuring the RDU according to the modified buffer allocation statement.

4. The system of claim 3, wherein configuring the RDU comprises configuring an address generator to execute the modified tensor indexing expression.

5. The system of claim 1, wherein the buffer view indicator is selected from the group consisting of a slice view indicator, a repeat view indicator, a temporal tile view indicator, a reshape view indicator, a permute view indicator, a layout view indicator and a roll view indicator.

6. The system of claim 1, wherein the buffer view indicator is stackable with other buffer view indicators.

7. The system of claim 1, wherein the buffer allocation statement specifies a buffer read pattern or a buffer write pattern.

8. A method for integrating buffer views into buffer access operations in a reconfigurable computing environment, the method comprising:
    detecting, in an instruction stream for a reconfigurable dataflow unit (RDU), a buffer allocation statement comprising a tensor indexing expression, a buffer view indicator and one or more buffer view parameters;
    lowering the buffer view parameters into the tensor indexing expression according to the buffer view indicator to produce a modified tensor indexing expression;
    removing the buffer view indicator from the buffer allocation statement to produce a modified buffer allocation statement comprising the modified tensor indexing expression; and
    allocating a buffer according to the modified buffer allocation statement.

9. The method of claim 8, further comprising configuring the RDU according to the modified buffer allocation statement.

10. The method of claim 9, wherein configuring the RDU comprises configuring an address generator to execute the modified tensor indexing expression.

11. The method of claim 8, further comprising processing data with the RDU according to the modified buffer allocation statement.

12. The method of claim 8, wherein the buffer view indicator is selected from the group consisting of a slice view indicator, a repeat view indicator, a temporal tile view indicator, a reshape view indicator, a permute view indicator, a layout view indicator and a roll view indicator.

13. The method of claim 8, wherein the buffer view indicator is stackable with other buffer view indicators.

14. The method of claim 8, wherein the buffer allocation statement specifies a buffer read pattern or a buffer write pattern.

15. A non-transitory computer readable medium having instructions encoded thereon to execute a method for integrating buffer views into buffer access operations in a reconfigurable computing environment, the method comprising:

detecting, in an instruction stream for a reconfigurable dataflow unit (RDU), a buffer allocation statement comprising a tensor indexing expression, a buffer view indicator and one or more buffer view parameters;

lowering the buffer view parameters into the tensor indexing expression according to the buffer view indicator to produce a modified tensor indexing expression;

removing the buffer view indicator from the buffer allocation statement to produce a modified buffer allocation statement comprising the modified tensor indexing expression; and allocating a buffer according to the modified buffer allocation statement.

16. The non-transitory computer readable medium of claim 15, wherein the method further comprises configuring the RDU according to the modified buffer allocation statement.

17. The non-transitory computer readable medium of claim 16, wherein configuring the RDU comprises configuring an address generator to execute the modified tensor indexing expression.

18. The non-transitory computer readable medium of claim 15, wherein the method further comprises processing data with the RDU according to the modified buffer allocation statement.

19. The non-transitory computer readable medium of claim 15, wherein the buffer view indicator is selected from the group consisting of a slice view indicator, a repeat view indicator, a temporal tile view indicator, a reshape view indicator, a permute view indicator, a layout view indicator and a roll view indicator.

20. The non-transitory computer readable medium of claim 15, wherein the buffer view indicator is stackable with other buffer view indicators.

21. The non-transitory computer readable medium of claim 15, wherein the buffer allocation statement specifies a buffer read pattern or a buffer write pattern.

* * * * *